3,205,131
STABLE CONCENTRATES OF ORGANIC PHOSPHORUS INSECTICIDES
Wolfgang Czerch, Leverkusen, Germany, assignor to Farbenfabriken Bayer Aktiengesellschaft, Leverkusen, Germany, a German corporation
No Drawing. Filed May 22, 1962, Ser. No. 196,609
Claims priority, application Germany, June 3, 1961, F 34,085
4 Claims. (Cl. 167—42)

The present invention relates to and has as its objects new and useful formulations of organic phosphoric compounds useful in the pesticide field and processes for the production thereof.

Organic insecticides based on organic phosphorus compounds frequently do not possess in emulsifiable concentrates the neccessary chemical stability for prolonged storage. This is to be seen either in that the concentrate of active substance, even after a short period of storage, cannot be brought onto the object by the methods customary for the purpose, e.g., by diluting with water to the aforesaid concentration for use, and spraying, or in that the biological activity itself declines, e.g., by decomposition and the like.

The stability of the active substance depends inter alia on the chemical constitution and can be decisively influenced in the concentrates by the type and amount of additives such as emulsifiers and solvents. In the production of commercial preparations of organic phosphorus insecticides, their solubility also plays a large part, since many active substances do not possess the required solubility in the usual solvents.

It has now been found that phosphorus insecticides which, on account of their small solubility in aromatic and aliphatic hydrocarbons such as, e.g., xylene, kerosene and others, must be dissolved, for the production of high percentage concentrates, in dimethyl formamide or dimethyl sulphoxide, whose outstanding solvent power for many active substances is known, but in which they do not possess the necessary chemical stability, are more satisfactorily dissolved in alkyene glycol alkyl ethers and aliphatic alcohols or mixtures thereof.

In accordance with the present invention it has now been found that the above mentioned active substances surprisingly possess, in contrast to the previously mentioned solvents dimethyl formamide and dimethyl sulphoxide, a very good stability in lower alkylene glycol alkyl ethers and lower aliphatic alcohols. On the basis of these solvents preparations can therefore be produced which can be stored unobjectionably for many years even under tropical conditions, without their biological activity being affected therefrom.

The surprisingly good stability of phosphorus insecticides in the described solvents to be used according to the invention could be shown by many storage experiments.

For a better illustration the following table gives, with 1-hydroxy - 2,2,2-trichloroethyl-phosphonic acid methyl ester as example (=active substance) a comparison of the analytically determined content of active substance before and after storage.

| Preparation | Content of active substance after storage at 40° C. | |
|---|---|---|
| | For 0 weeks (percent) | For 24 weeks (percent) |
| Active substance in dimethyl formamide | 49.6 | 25.2 |
| Active substance in dimethyl sulphoxide | 53.1 | 20.9 |
| Active substance in ethanol | 51.9 | 42.0 |
| Active substance in ethylene glycol mono methyl ether | 50.3 | 42.5 |

From the foregoing table the rapid decomposition of 1-hydroxy - 2,2,2-trichloroethyl - phosphonic acid methyl ester in dimethyl formamide or dimethyl sulphoxide and the stability of solutions in ethylene glycol monomethyl ether and ethanol is clearly recognisable.

The concentrates producible according to the invention can, e.g., be produced in the following way: the active compounds are dissolved in alkylene glycol alkyl ethers or their mixtures with aliphatic alcohols, and then the further possibly required assistants, such as emulsifiers, wetting agents, adhesives, thickeners, colouring matter and similar substances, are added to the solution or suspension.

The preparations produced in this way can be applied at will either concentrated or diluted with water, emulsions being formed in the case of water-insoluble active substances. In the case where the concentrates contain other water-immiscible solvents, water-soluble active substances can also form emulsions.

From the series of phosphorus insecticides which can preferably be prepared for the production of stable concentrates in the solvents according to the invention, there may be mentioned, for example: 1-hydroxy-2,2,2,-trichloroethyl-phosphonic acid methyl ester and similar compounds as well as alkyl-sulphoxyl-alkyl-thio-phosphoric (-onic, -inic) acid esters generally. The latter esters and their method production are disclosed, for example, in U.S. Patent No. 2,963,505 as well as German Patent Nos. 947,368, 949,229, and 964,045.

The following examples are given for the purpose of illustrating the invention.

*Example 1*

50 parts by weight of 1-hydroxy-2,2,2,-trichloroethyl phosphonic acid methyl ester is dissolved in 50 parts by weight of ethylene glycol monomethyl ether, with warming if necessary, and 5 parts by weight of methanol are added to the clear solution to increase the cold-stability, and for improvement of the wettability of plants, 3 parts by weight of a surface active substance, e.g., a nonylphenol polyglycol ether are introduced. A preparation is obtained which is stable for years, and which can be diluted with water as desired.

*Example 2*

40 parts by weight of the active compound indicated in Example 1 and 4 parts of another active substance insoluble in water or in water-miscible solvents, e.g., parathion, are dissolved in a mixture of 30 parts by weight of ethylene glycol monomethyl ether and 20 parts by weight of an aromatic hydrocarbon, e.g., xylene, with warming if necessary, and 10 parts by weight of ethanol are added to improve the solubility. This solution, stable for years, can be applied concentrated or emulsified in water treated with 5 parts by weight of a commercial emulsifier.

Example 3

80 parts by weight of the active substance indicated in Example 1 are dissolved in 20 parts by weight of ethylene glycol monomethyl ether with warming and treated with 5 parts by weight of a surface active substance (nonyl phenol polyglycol ether, NP 10). After cooling a pasty preparation is obtained which is stable for years and can be mixed with water in any proportion.

Example 4

50 parts by weight of S-(ethyl-sulphoxyl-ethyl)-O,O-dimethyl-thiophosphoric acid ester are mixed with 50 parts by weight of ethylene glycol monomethyl ether. For improvement of the wetting properties 5 parts by weight of a surface active substance are then added. A clear solution is obtained which can be stored unobjectionably for years and can be diluted with water as desired.

I claim:

1. A stable concentrate comprising an organic phosphorus insecticide selected from the group consisting of 1-hydroxy-2,2,2-trichloroethyl phosphonic acid methyl ester and S-(ethyl-sulfoxyl-ethyl)-O,O-dimethyl-thiophosphoric acid ester and an auxiliary solvent selected from the group consisting of lower alkylene glycol alkyl ethers and their mixtures with a member selected from the group consisting of methanol and ethanol.

2. The stable concentrate of claim 1 wherein the organic insecticide is 1-hydroxy-2,2,2-trichloroethyl phosphonic acid methyl ester and the auxiliary solvent is ethylene glycol monomethyl ether.

3. The stable concentrate of claim 1 wherein the organic insecticide is 1-hydroxy-2,2,2-trichloroethyl phosphonic acid methyl ester and the auxiilary solvent is ethylene glycol monomethyl ether in mixture with methanol.

4. The stable concentrate of claim 1 wherein the organic insecticide is S-(ethyl-sulfoxyl-ethyl)-O,O-dimethyl-thio-phosphoric acid ester and the auxiliary solvent is ethylene glycol monomethyl ether.

References Cited by the Examiner

UNITED STATES PATENTS

| | | | |
|---|---|---|---|
| 2,927,882 | 3/60 | Trademan et al. | 260—461 |
| 2,952,700 | 9/60 | Lorenz et al. | 260—461 |
| 2,979,522 | 4/61 | Johnston et al. | 260—461 |

OTHER REFERENCES

Agricultural and Food Chemistry, vol. 5, No. 3, March 1957, pages 186–198.

JULIAN S. LEVITT, *Primary Examiner.*

MORRIS LIEBMAN, *Examiner.*